US011002383B2

(12) United States Patent
Naugler (10) Patent No.: US 11,002,383 B2
(45) Date of Patent: May 11, 2021

(54) COMBINATION SECURING CLIPS (71) Applicant: HUBBELL INCORPORATED, Shelton, CT (US)

(72) Inventor: Kurt Leslie Gray Naugler, Bedford, NH (US)

(73) Assignee: Hubbell Incorporated, Shelton, CT (US)

( * ) Notice: Subject to any disclaimer, the term of this patent is extended or adjusted under 35 U.S.C. 154(b) by 0 days.

(21) Appl. No.: 16/055,537

(22) Filed: Aug. 6, 2018

(65) Prior Publication Data
US 2020/0041044 A1 Feb. 6, 2020

(51) Int. Cl.
| F16B 2/20 | (2006.01) |
| F16L 3/233 | (2006.01) |
| F16L 3/24 | (2006.01) |
| F16B 21/08 | (2006.01) |

(52) U.S. Cl.
CPC .............. *F16L 3/233* (2013.01); *F16B 2/20* (2013.01); *F16B 21/084* (2013.01); *F16L 3/24* (2013.01)

(58) Field of Classification Search
CPC ....... F16L 3/233; F16L 3/2332; F16L 3/2334; F16L 3/2336; F16L 3/2338; F16L 21/084; F16L 3/24; F16B 2/20; F16B 2/22
USPC ............. 248/74.3, 74.4, 65, 67.7, 72, 316.1, 248/316.7, 316.6, 316.4, 231.81, 230.7, 248/228.7, 229.26, 229.16
See application file for complete search history.

(56) References Cited

U.S. PATENT DOCUMENTS

| 2,499,637 | A | * | 3/1950 | Flora ....................... B22C 21/14 |
| | | | | 24/295 |
| 3,444,596 | A | * | 5/1969 | Soltysik ................ F16B 21/088 |
| | | | | 248/73 |
| 3,588,962 | A | | 6/1971 | Feldberg |
| 4,303,217 | A | | 12/1981 | Garfinkle |
| 4,304,382 | A | | 12/1981 | Jelen |
| 4,572,466 | A | | 2/1986 | Yamaguchi |
| 4,619,428 | A | | 10/1986 | Bailey |
| 5,368,261 | A | | 11/1994 | Caveney |
| 5,759,004 | A | * | 6/1998 | Kuffel .................... F16B 21/086 |
| | | | | 24/295 |
| 6,189,847 | B1 | | 2/2001 | Hart |

(Continued)

FOREIGN PATENT DOCUMENTS

| CN | 106439237 | 2/2017 |
| DE | 10148216 A1 | 12/2002 |

OTHER PUBLICATIONS

Wiley clips advertisement, prior to Aug. 6, 2018.

*Primary Examiner* — Nkeisha Smith
(74) *Attorney, Agent, or Firm* — Ohlandt, Greeley, Ruggiero & Perle, LLP (57) ABSTRACT

A combination securing clip is provided that includes at least two different connectors each securable to a desired surface and a region securable to a conduit. The region can be directly and/or indirectly secured to the conduit. In some embodiments, the at least two connectors include two different types of connectors—and include a push-in connector and a slide-on connector. Thus, the combination securing clip can include a slide-on connector configured to slide on to a surface to secure the clip to the surface, a push-in connector configured to push in to an opening in the surface to secure the clip to the surface, and a directly and/or indirectly region securable to a conduit.

13 Claims, 9 Drawing Sheets

(56) References Cited

U.S. PATENT DOCUMENTS

| | | | |
|---|---|---|---|
| 6,273,656 B1 | 8/2001 | Cleland | |
| 6,276,644 B1* | 8/2001 | Jennings | F16L 3/04 248/49 |
| D467,792 S | 12/2002 | Zadak | |
| 6,513,772 B2* | 2/2003 | Gary | F16B 13/08 248/231.31 |
| 6,719,513 B1 | 4/2004 | Moutousis | |
| D502,388 S | 3/2005 | Cortez | |
| 7,178,206 B2* | 2/2007 | Kuhnle | B60R 13/0206 24/297 |
| D556,546 S | 12/2007 | Swanson et al. | |
| D567,638 S | 4/2008 | Rieder | |
| D613,150 S | 4/2010 | Rieder | |
| 7,717,387 B2* | 5/2010 | Naheem | B60M 5/00 248/316.7 |
| D632,158 S | 2/2011 | Yang et al. | |
| 8,016,530 B2* | 9/2011 | Johnson | F16B 37/043 411/173 |
| D698,287 S | 1/2014 | Terpsma | |
| 9,086,086 B2* | 7/2015 | Bentrim | F16B 21/20 |
| D741,146 S | 10/2015 | Delrue et al. | |
| D758,174 S | 6/2016 | Lee et al. | |
| 9,434,323 B2* | 9/2016 | Huchet | B60R 13/0206 |
| D782,292 S | 3/2017 | Wessel | |
| D824,430 S | 7/2018 | Sivinski et al. | |
| D840,282 S | 2/2019 | Coste | |
| D850,887 S | 6/2019 | Solow | |
| 2002/0005463 A1 | 1/2002 | Paske et al. | |
| 2003/0088948 A1 | 5/2003 | Cook | |
| 2006/0239796 A1 | 10/2006 | Franks | |
| 2007/0027807 A1 | 2/2007 | Bronstein | |
| 2007/0264169 A1* | 11/2007 | Chen | A61L 9/12 422/124 |
| 2009/0294602 A1 | 12/2009 | Korczak | |
| 2011/0163562 A1* | 7/2011 | Smith | B60R 13/0206 296/1.07 |
| 2012/0217365 A1* | 8/2012 | Konda | H05K 9/0022 248/316.7 |
| 2013/0099070 A1 | 4/2013 | Chirpich et al. | |
| 2013/0255123 A1* | 10/2013 | Boyer | G09F 7/16 40/607.14 |
| 2014/0131528 A1 | 5/2014 | Blakeley et al. | |
| 2015/0097089 A1 | 4/2015 | Taylor | |
| 2016/0121822 A1* | 5/2016 | Shaw | B60R 16/0215 248/74.3 |
| 2016/0281881 A1 | 9/2016 | Vaccaro et al. | |
| 2017/0159849 A1 | 6/2017 | Beyer | |
| 2018/0135778 A1 | 5/2018 | Vaccaro et al. | |

* cited by examiner

COMBINATION SECURING CLIPS

BACKGROUND

1. Field of the Invention

The present disclosure is related to securing clips. More particularly, the present disclosure is related to combination securing clips that include at least two different connectors.

2. Description of Related Art

In many applications, the securing clips are used to secure objects such as, but not limited to, wires, hoses, fiber optics, and other conduits (referred to herein as "conduits") to various surfaces. For example, the conduits in vehicles such as cars, planes and other vehicles are often secured to a desired surface of the vehicle. Similarly, the conduits are often secured to surfaces of houses, buildings, telecommunication towers, solar arrays, and other surfaces.

In some instances, some instances the clips have a region that directly secures the conduit to the surface. In other instances, the clips are used to indirectly secure the conduit to the surface through the use of, for example, bundling straps.

Bundling straps are well known and are available in both permanent and releasable forms. These bundling straps—often made of plastic—are commonly referred to as cable ties, wire ties, hose ties, steggel ties, zap straps, zip ties, and others. The bundling straps can be wrapped around one or more conduits with the loose end of the strap inserted into a head. As the free end of the strap is pulled through the head, the strap tightens around the conduits with a pawl acting on teeth of the strap to prevent the free end from releasing or loosening. Some bundling straps are configured to selectively release the teeth and/or pawl from one another so that the bundling strap can be loosened and/or removed.

Since there are many different types of surfaces that require the use of such clips, it has been determined by the present disclosure that there is a need for combination securing clips that provide multiple different connectors and/or connector types for securement to support surfaces—for direct and/or indirect securement of conduits to the support surface.

SUMMARY

A combination securing clip is provided by the present disclosure—where the clip includes at least two different connectors—that allow the clip to be secured to a desired surface by either connector. In some embodiments, the clip includes at least two different types of connectors—that allow the clip to be secured to a desired surface by either connector type.

The clip include a region that allows for direct and/or indirect securement of a conduit to the clip. The direct connection, when present, can be formed by the region having a leg that secures the conduit to the region. The indirect connection, when present, can be formed by the region being configured to have a bundling strap to be wrapped around or passed through the region. In other embodiments, the clip is integrally formed or formed as one piece with the bundling strap—forming the direct connection.

In one embodiment, the at least two different types of connectors include a push-in connector and slide-on connector—that allow the clip to be secured to the desired surface by either pushing the push-in connector into an opening of the surface or sliding the slide-on connector onto a portion of the surface.

A combination securing clip is provided that includes at least two different connectors each securable to a desired surface and a region securable to a conduit.

In some embodiments either alone or together with any one or more of the aforementioned and/or after-mentioned embodiments, the region is configured to be directly or indirectly secured to the conduit.

In some embodiments either alone or together with any one or more of the aforementioned and/or after-mentioned embodiments, the region includes an integral bundling strap to secure the conduit.

In some embodiments either alone or together with any one or more of the aforementioned and/or after-mentioned embodiments, the region includes an opening configured to receive a bundling strap to secure the conduit.

In some embodiments either alone or together with any one or more of the aforementioned and/or after-mentioned embodiments, the at least two connectors include two different types of connectors.

In some embodiments either alone or together with any one or more of the aforementioned and/or after-mentioned embodiments, the two different types of connectors include a push-in connector and a slide-on connector.

A combination securing clip is provided that includes a slide-on connector configured to slide on to a surface to secure the clip to the surface, a push-in connector configured to push in to an opening in the surface to secure the clip to the surface, and a region securable to a conduit.

In some embodiments either alone or together with any one or more of the aforementioned and/or after-mentioned embodiments, the region is integrally formed with a bundling strap.

In some embodiments either alone or together with any one or more of the aforementioned and/or after-mentioned embodiments, the region includes a leg securable to the conduit.

In some embodiments either alone or together with any one or more of the aforementioned and/or after-mentioned embodiments, the region includes an opening configured to receive a bundling strap.

In some embodiments either alone or together with any one or more of the aforementioned and/or after-mentioned embodiments, the region includes an opening having a bundling strap received therein.

In some embodiments either alone or together with any one or more of the aforementioned and/or after-mentioned embodiments, the clip further includes a pair of arms that form the slide-on connector and form the push-in connector.

In some embodiments either alone or together with any one or more of the aforementioned and/or after-mentioned embodiments, the pair of arms define an inner open region that provides the slide-on connector.

In some embodiments either alone or together with any one or more of the aforementioned and/or after-mentioned embodiments, the pair of arms further include one or more teeth angled in a direction away from a slide-on direction.

In some embodiments either alone or together with any one or more of the aforementioned and/or after-mentioned embodiments, the one or more teeth are cam surfaces to bias the pair of arms outward as the surface is slid into the inner open region in the slide-on direction.

In some embodiments either alone or together with any one or more of the aforementioned and/or after-mentioned embodiments, the one or more teeth are contact surfaces to aid in preventing the surface from being withdrawn from the inner open region.

In some embodiments either alone or together with any one or more of the aforementioned and/or after-mentioned embodiments, the one or more teeth are on opposing arms and are vertically and/or horizontally offset from one another.

In some embodiments either alone or together with any one or more of the aforementioned and/or after-mentioned embodiments, the pair of arms further include one or more stops that are angled in a direction toward a slide-on direction.

In some embodiments either alone or together with any one or more of the aforementioned and/or after-mentioned embodiments, the one or more stops are on opposing arms and are vertically and/or horizontally offset from one another.

In some embodiments either alone or together with any one or more of the aforementioned and/or after-mentioned embodiments, the pair of arms define an outer region that provides the push-in connector.

In some embodiments either alone or together with any one or more of the aforementioned and/or after-mentioned embodiments, the pair of arms further include one or more barbs that are angled in a direction away from a push-in direction.

In some embodiments either alone or together with any one or more of the aforementioned and/or after-mentioned embodiments, the one or more barbs are cam surfaces to bias the pair of arms inward as the push-in connector is pushed into the opening in the push-in direction.

In some embodiments either alone or together with any one or more of the aforementioned and/or after-mentioned embodiments, the one or more barbs are contact surfaces to aid in preventing push-in connector from being withdrawn from opening.

In some embodiments either alone or together with any one or more of the aforementioned and/or after-mentioned embodiments, the push-in and slide-on connectors and the region are integrally formed from a metal stamping.

The above-described and other features and advantages of the present disclosure will be appreciated and understood by those skilled in the art from the following detailed description, drawings, and appended claims.

DETAILED DESCRIPTION

Referring to the drawings and in particular to FIGS. 1-4, an exemplary embodiment of a combination securing clip according to the present disclosure is shown and is generally referred to by reference numeral 10. Advantageously, clip 10 includes at least two different types of connectors, illustrated as a slide-on connector 12 and a push-in connector 14, that are configured to secure the clip to a surface 16.

Clip 10 includes a region 18 that can be used to secure a conduit to the clip. For ease of discussion, region 18 is illustrated as an opening positioned and configured to receive a bundling strap 20 to secure the strap to the clip. In this manner, clip 10 allows the user to secure strap 20 to surface 16 by either sliding slide-on connector 12 onto the surface or pushing the push-in connector 14 into an opening 22 in the surface.

Thus, clip 10 simplifies the connection of straps 20 to surfaces—by allowing the user to maintain only one component that can be secured to surfaces in different ways. Here, clip 10 is configured to indirectly secure the conduit to the surface 16—by way of region 18 receiving strap 20.

Clip 10 is shown having six regions 18—in the form of openings—that are shaped and configured to receive bundling strap 20 through any two of the openings. Of course, it is contemplated by the present disclosure for clip to have any desired number of regions 18 in the form of openings.

Further, it is contemplated by the present disclosure for clip 10 to be configured to directly secure the conduit to the surface—as will be described in more detail below with respect to embodiments in FIGS. 15-16 and FIGS. 19-21.

In the embodiment of clip 10 illustrated in FIGS. 1-4, slide-on connector 12 and push-in connector 14 are formed by a pair of arms 24.

Arms 24 define an inner open region 26—that provides the slide-on connector 12. Here, arms 24 can include one or more teeth 28 (one shown on each arm). Teeth 28 are angled in a direction away from a slide-on direction 30 onto surface 16. In this manner, teeth 28 act as cam surfaces to bias arms 24 outward as surface 16 is slid into open region 26, then can provide contact surfaces to aid in preventing the surface from being withdrawn from the open region.

Figure 1:
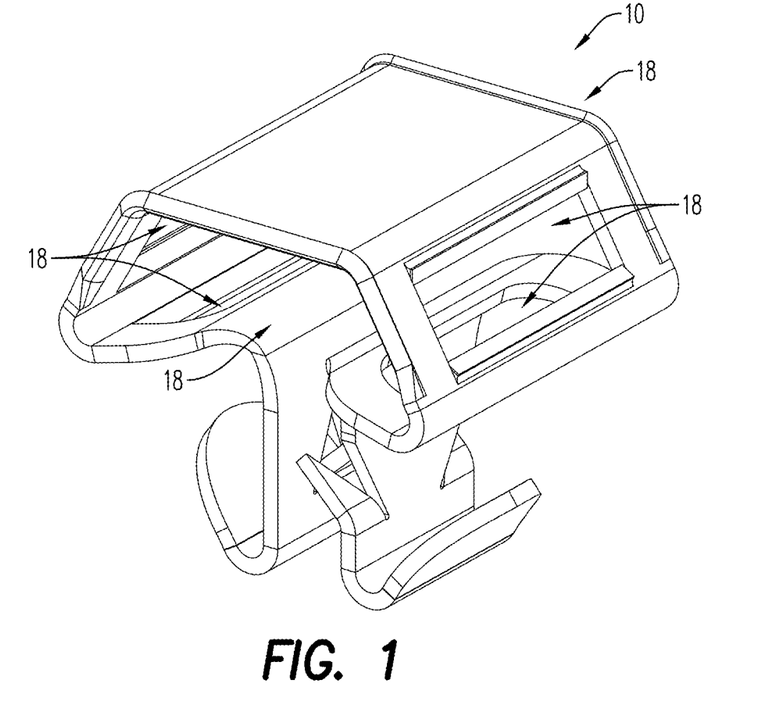
FIG. 1 a top, perspective view of a combination securing clip according to an exemplary embodiment of the present disclosure.
Figure 2:
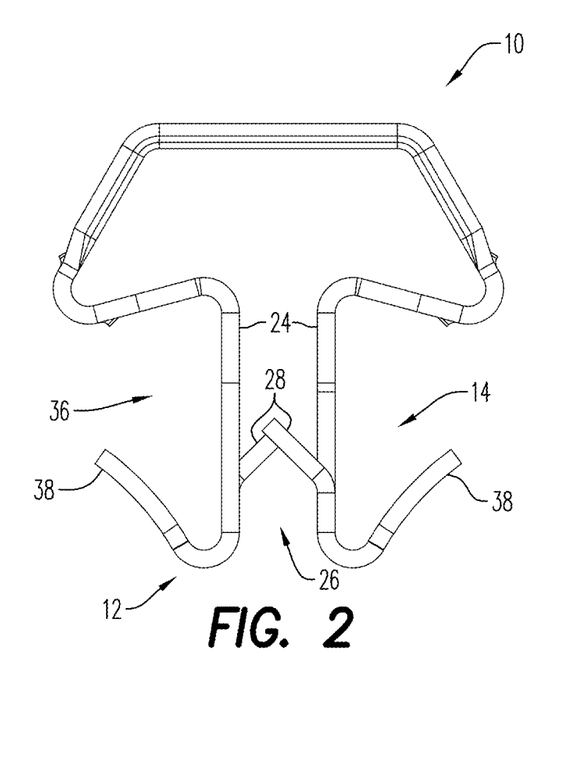
FIG. 2 a side view of the combination securing clip of FIG. 1.
Figure 3:
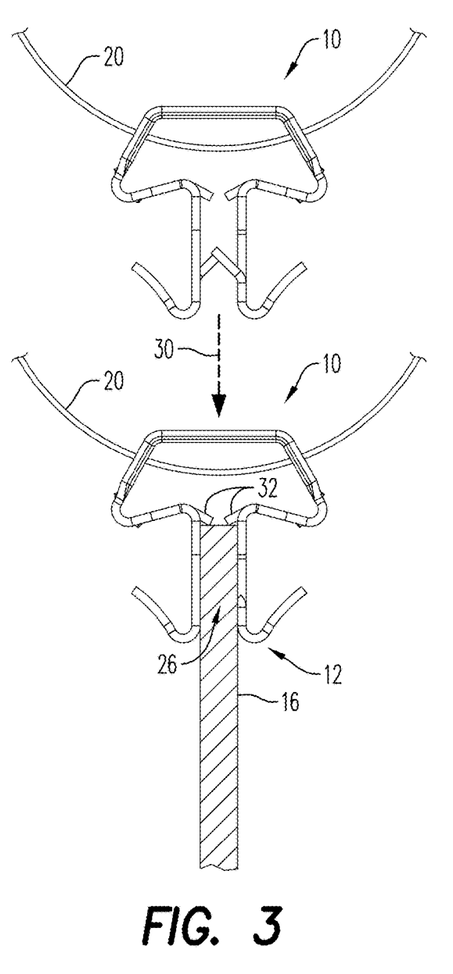
FIG. 3 is a schematic depiction of the combination securing clip of FIG. 1 forming a slide-on connection with a support surface.
Figure 4:
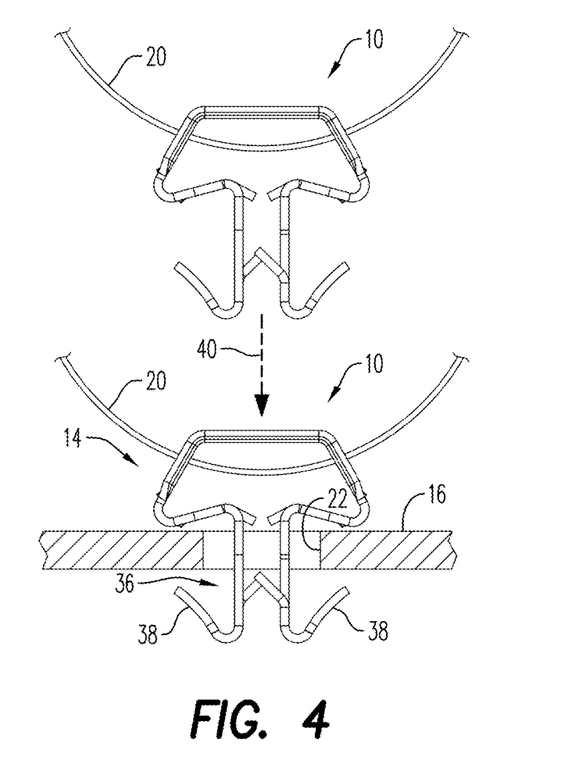
FIG. 4 is a schematic depiction of the combination securing clip of FIG. 1 forming a push-in connection with a support surface.
Figure 5:
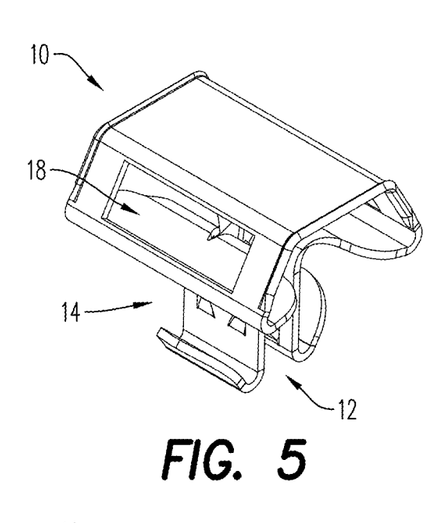
FIG. 5 a top, perspective view of a combination securing clip according to an alternate exemplary embodiment of the present disclosure.
Figure 6:
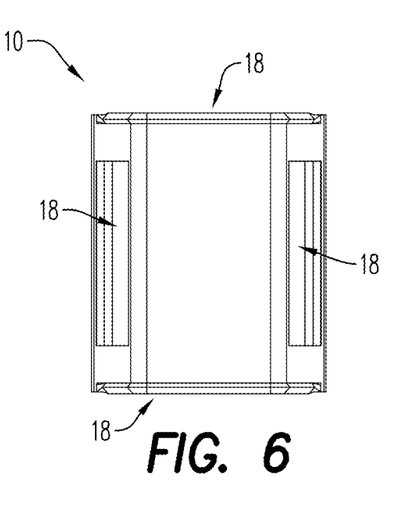
FIG. 6 a top view of the combination securing clip of FIG. 5.
Figures 7, 9:
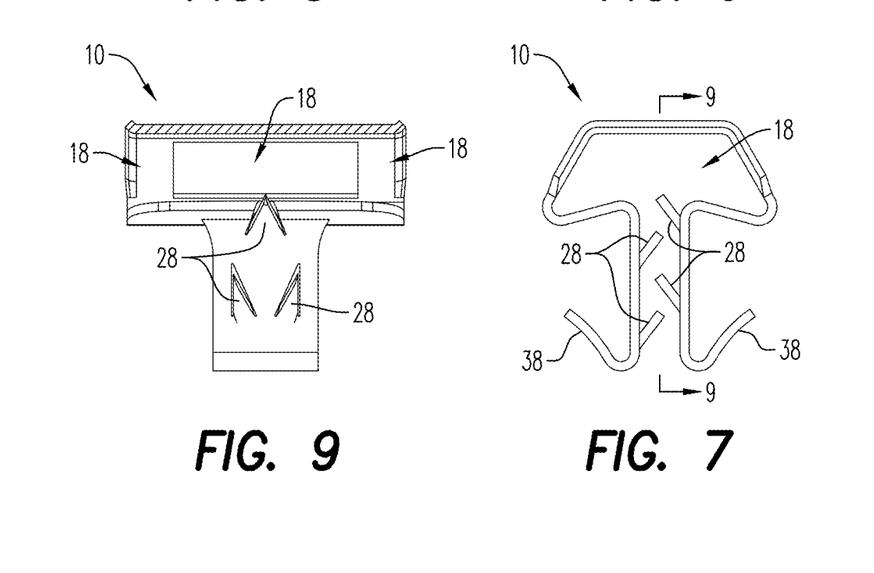
FIG. 7 a side view of the combination securing clip of FIG. 5.
FIG. 9 a sectional view of the combination securing clip of FIG. 5 taken along line 9-9 of FIG. 7.
Figure 8:
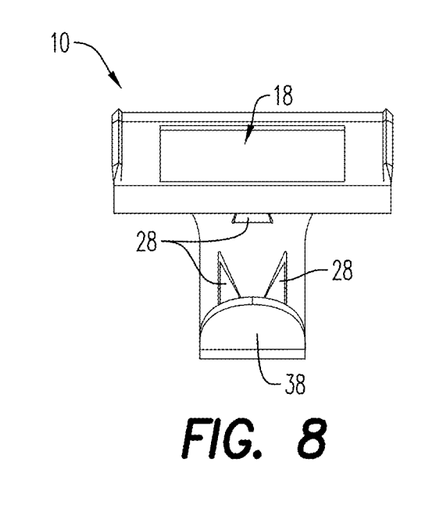
FIG. 8 a front view of the combination securing clip of FIG. 5.
Figures 10, 11:
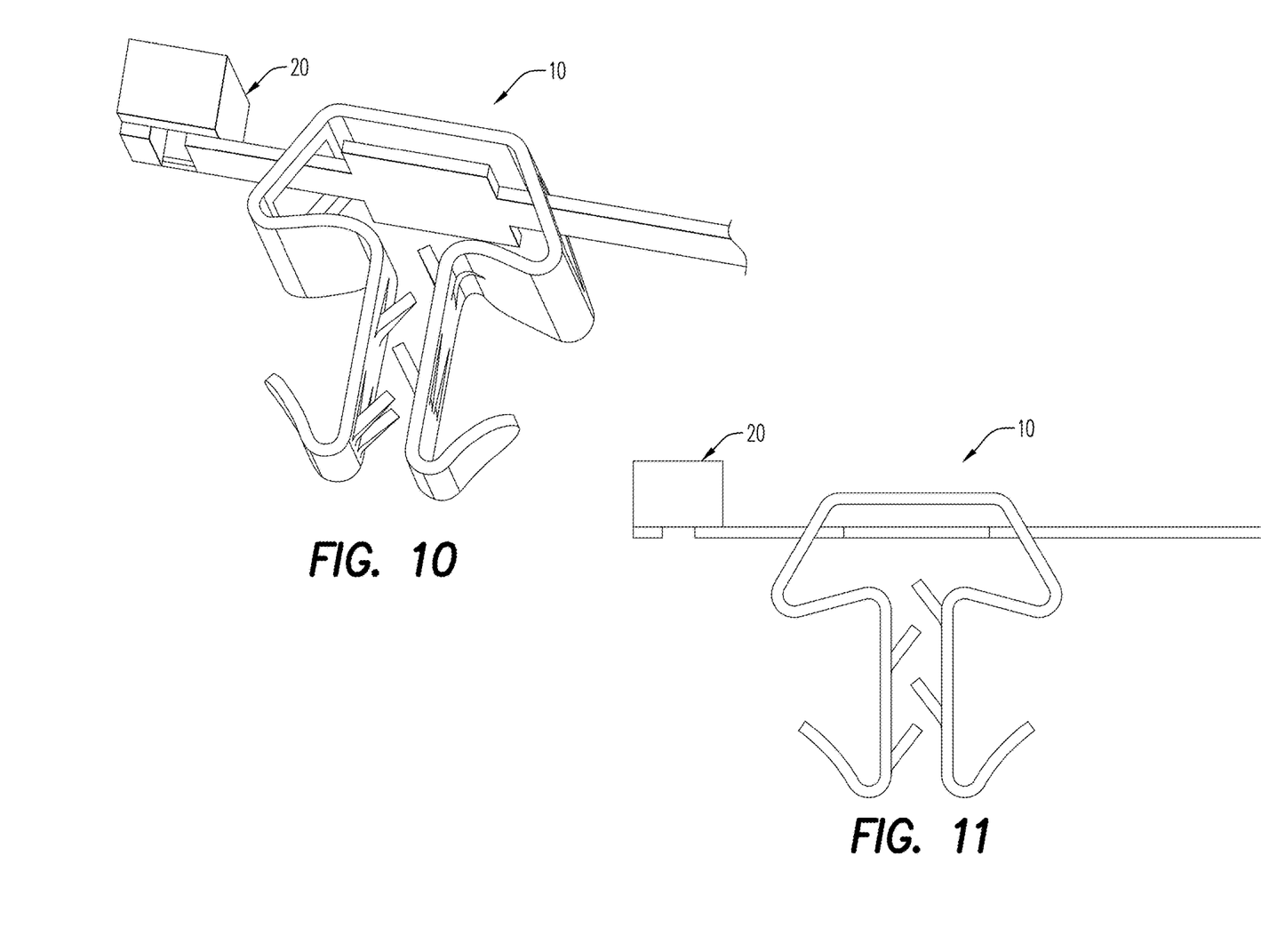
FIG. 10 is a bottom, perspective view of the combination securing clip of FIG. 5 with a bundling strap.
FIG. 11 is a side view of the combination securing clip of FIG. 5 with a bundling strap.

In some embodiments, at least one of arms 24 can include a stop 32 that is angled in a direction towards slide-on direction 30—shown in FIGS. 3 and 4—one stop 32 is shown on each arm. Here, stop(s) 32 can define an innermost location for slide-on connector 12 during the sliding-on of clip 10 onto surface 16.

Arms 24 also define an outer region 36—that provides push-in connector 14. Here, arms 24 can include one or more barbs 38 (one shown on each arm). Barbs 38 are angled in a direction away from a push-in direction 40 onto surface 16. In this manner, barbs 38 act as surfaces to bias arms 24 inward as clip 10 is pushed into opening 22 of surface 16, then can provide contact surfaces to aid in preventing the clip from being withdrawn from the opening.

Thus, it can be seen that in the illustrated embodiment the same pair of arms 24 that form slide-on connector 12 also form push-in connector 14. Here, inner open region 26 defined by arms 24 forms slide-on connector 12, while outer region 36 defined by the arms forms push-in connector 14. Of course, it is contemplated by the present disclosure for clip 10 to include slide-on connector 12 and push-in connector 14 be formed separately formed.

During the use of slide-on connector 12, arms 24 are resiliently biased outward and form a spring clip where the arms resiliently secure clip 10 onto surface 16. Conversely and during the use of push-in connector 14, arms 24 are resiliently biased inward during insertion into opening 22.

In some embodiments, one arm 24 includes at least one tooth 28 and/or at least one stop 32, while the other arm 24 includes also includes at least one tooth 28 and/or at least one stop 32. As discussed above, arms 24 flex inward toward one another during the use of push-in connector 14. Here, teeth 28, when present, and/or stops 32, when present, on opposing arms 24 are offset—vertically and/or horizontally—from one another to prevent interference with the inner flexion of arms 24.

Clip 10 can be formed of any material having sufficient strength and resiliency to allow slide-on connector 12 to resiliently slide onto the surface and allow push-in connector 14 to resiliently push into opening 22. In some embodiments, clip 10 is formed of stamped metal. In other embodiments, clip 10 is formed of molded or cast plastic or metal.

Referring now to FIGS. 6-11, clip 10 is shown having three teeth 28 on each arm 24 and having one opening 18 on each arm for receiving strap 20—plus two openings at opposite sides of the clip.

Figure 12:
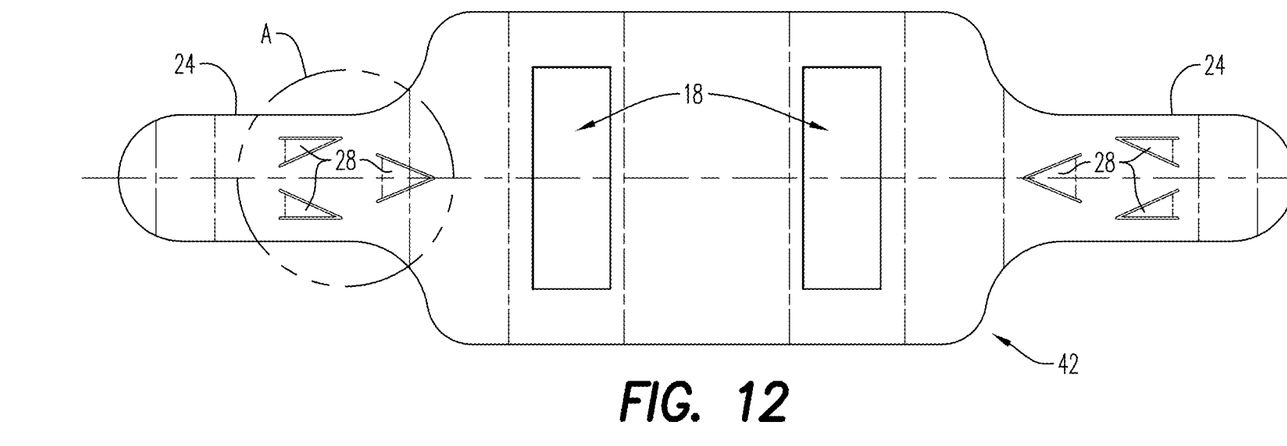
FIG. 12 is a top view of a stamping for use in forming the combination securing clip of FIG. 5.
Figure 13:
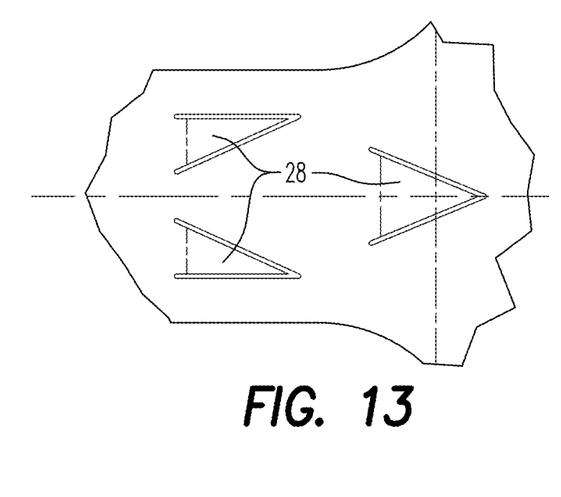
FIG. 13 is an enlarged view taken at circle A of FIG. 12.
Figure 14:
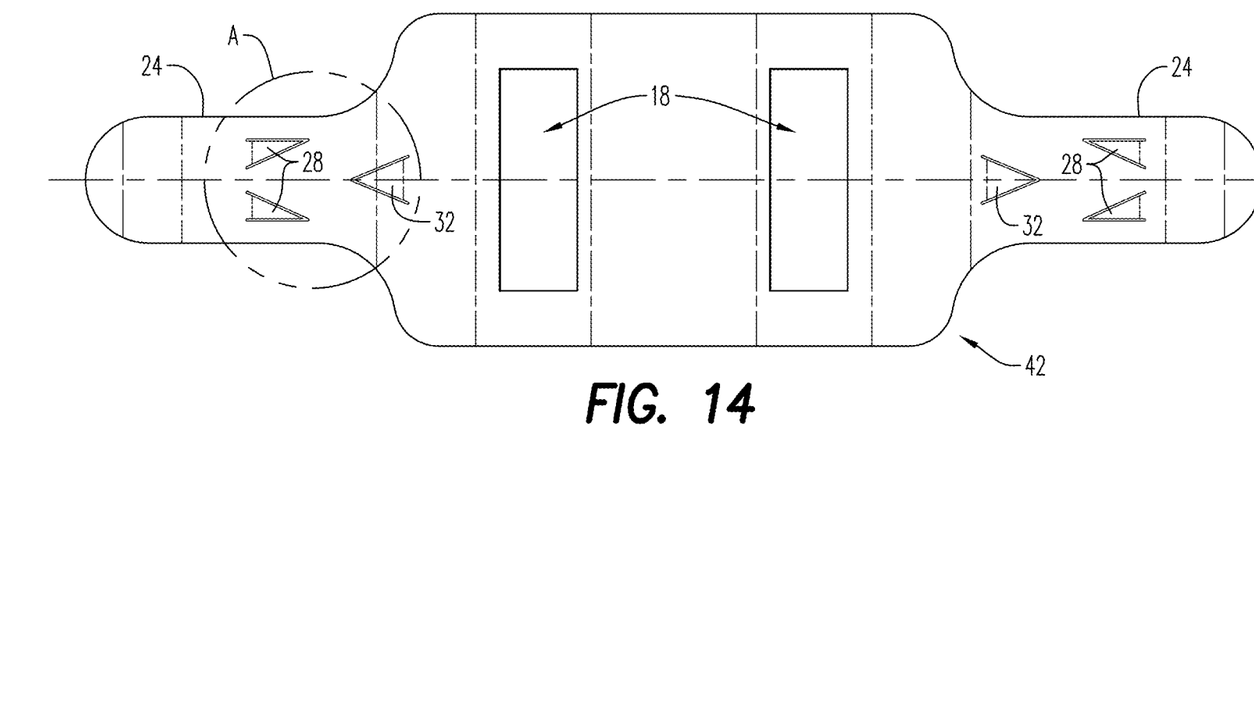
FIG. 14 is a top view of another embodiment of a stamping for use in forming the combination securing clip of the present disclosure.

Clip 10 is shown in FIGS. 12 and 13 as a stamping 42 prior to being bent to define the clip. Here, clip 10 is formed from a simple metal stamping. Additionally, clip 10 is shown in FIG. 14 as stamping 42 prior to being bent to define the clip—and includes stops 32.

Figure 15:
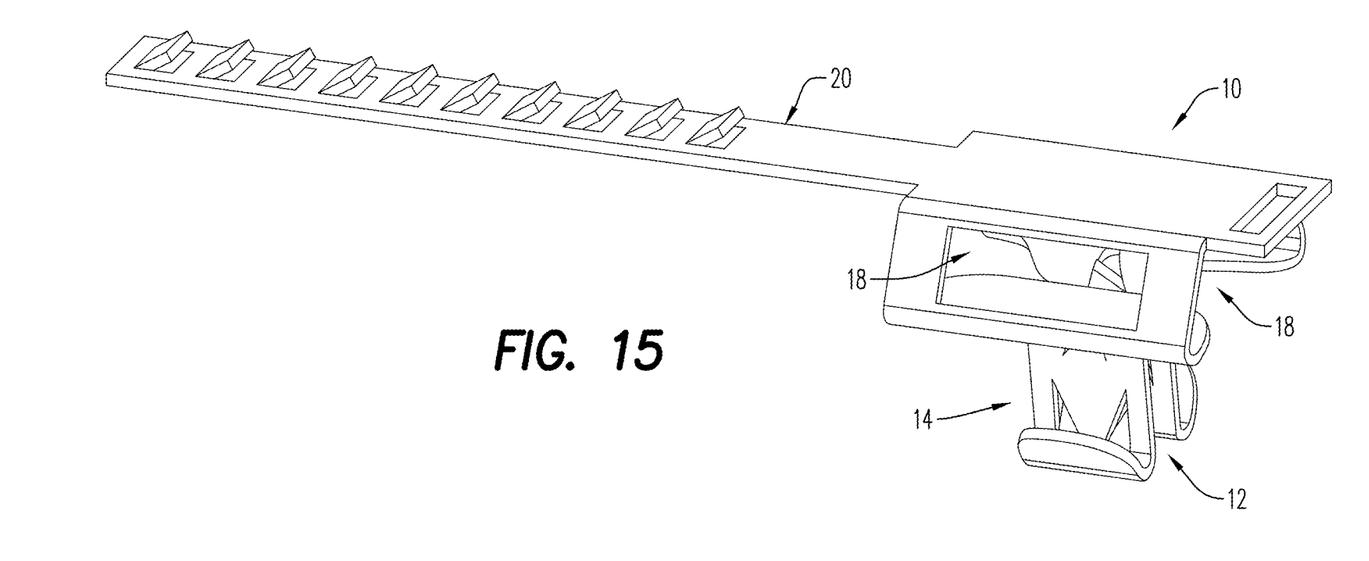
FIG. 15 is a top perspective view of a combination securing clip according to another exemplary embodiment of the present disclosure.
Figure 16:
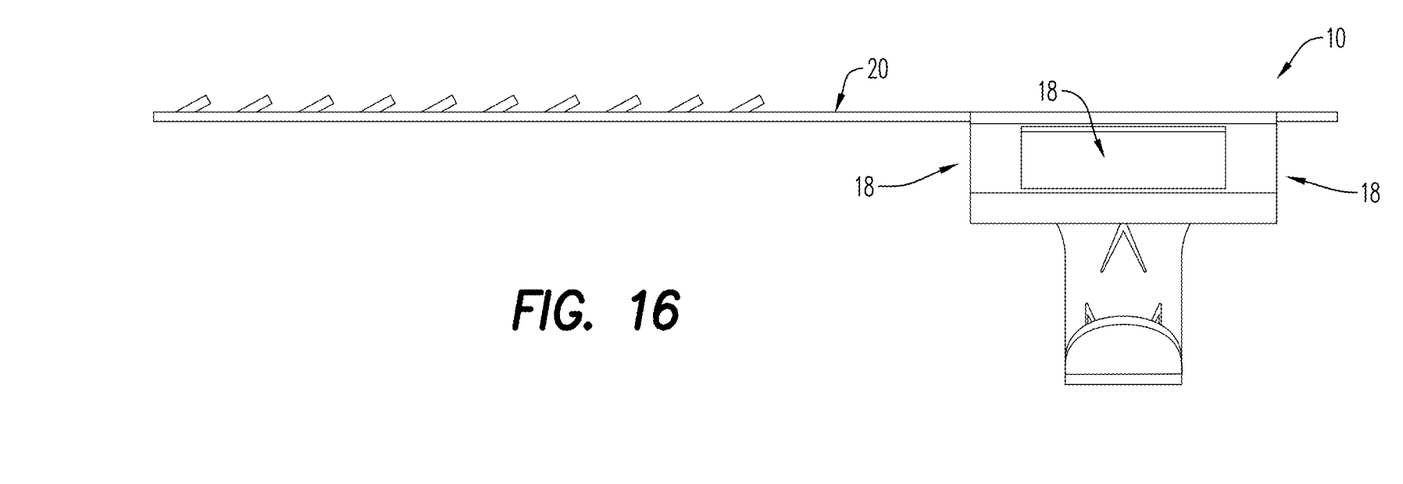
FIG. 16 is a side view of the combination securing clip of FIG. 15.

Referring now to FIGS. 15 and 16, clip 10 is shown having strap 20 integrally formed therewith and having one opening 18 on each arm and two openings at opposite sides of the clip for receiving one or more additional straps (not shown). In this manner, clip 10 is configured to directly secure the conduit to surface 16.

Strap 20 can be formed of any desired material. For example, strap 20 can be formed of plastic and can be integrally formed as one piece with clip 10 in any desired manner such as, but not limited to, a mechanical connection, a thermal connection, an adhesive connection, integrally molded from one piece, and any combinations thereof. In other embodiments, strap 20 can be formed of metal and can be integrally formed as one piece with clip 10 in any desired manner such as, but not limited to, a mechanical connection, a thermal connection, an adhesive connection, integrally stamped from one piece, and any combinations thereof.

Figure 17:
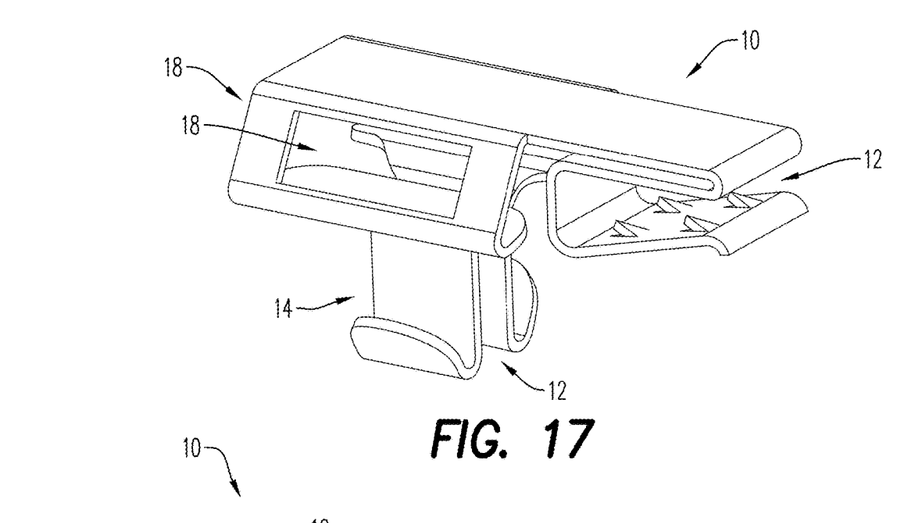
FIG. 17 is a top perspective view of a combination securing clip according to another exemplary embodiment of the present disclosure.
Figure 18:
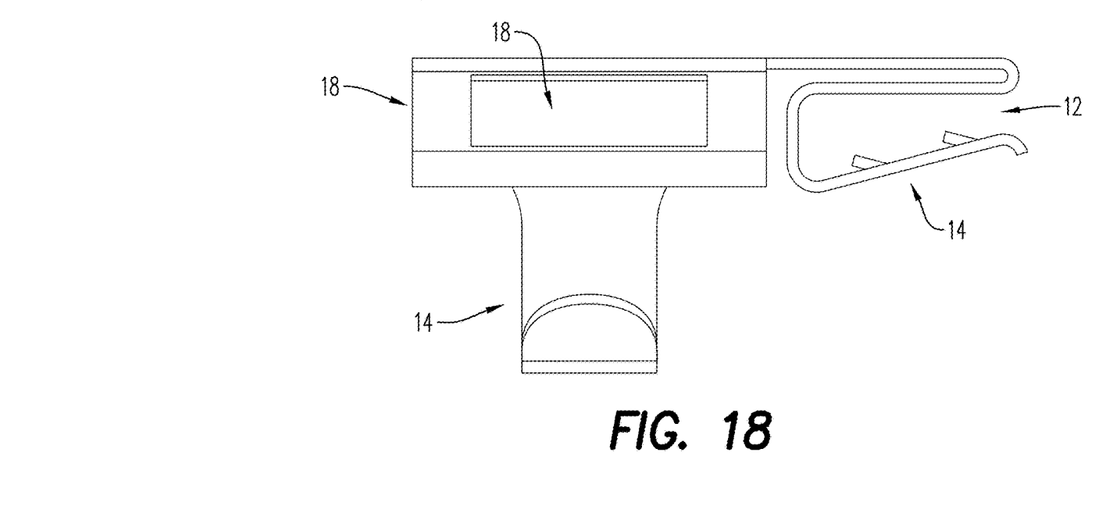
FIG. 18 is a side view of the combination securing clip of FIG. 17.

It should be recognized that clip 10 is disclosed above by way of example as having one slide-on connector 12 and one push-in connector 14 configured to secure the clip to a surface 16. However, it is contemplated by the present disclosure for clip 10 to include more than two connectors as illustrated in FIGS. 17 and 16. Here, clip 10 is illustrated having two slide-on connectors 12 and two push-in connectors 14 to provide the clip with even greater flexibility regarding the way the clip is connected to the surface 16.

Accordingly, it is contemplated by the present disclosure for clip 10 to have at least two connectors, preferably at least two different types of connectors. In various embodiments, both connectors are slide-on connectors, or both connectors are push-in connectors, or one connector is a slide-on connector and the other is a push-in connector, or one or more connectors that are slide-on connectors are combined with one or more connectors that are push-in connectors.

Figure 19:
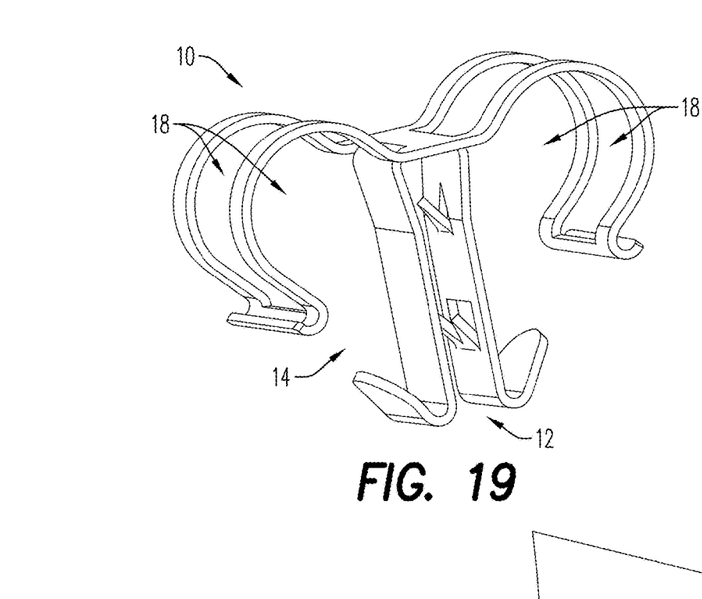
FIG. 19 is a top perspective view of a combination securing clip according to another exemplary embodiment of the present disclosure.
Figure 20:
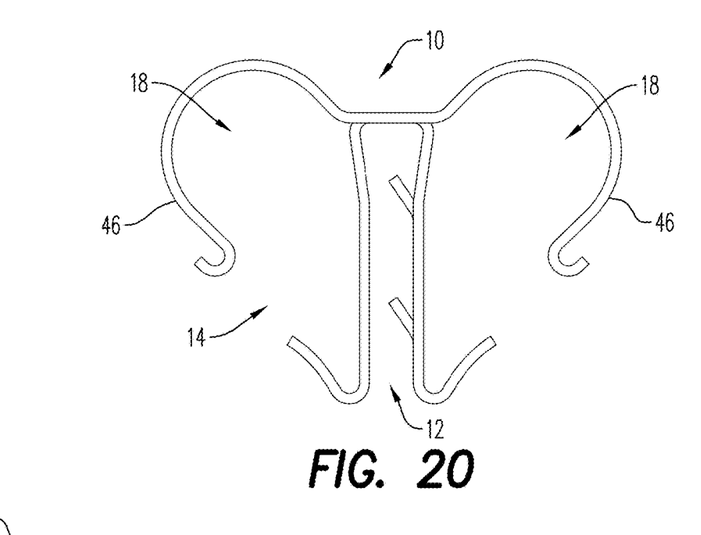
FIG. 20 is a side view of the combination securing clip of FIG. 19.
Figure 21:
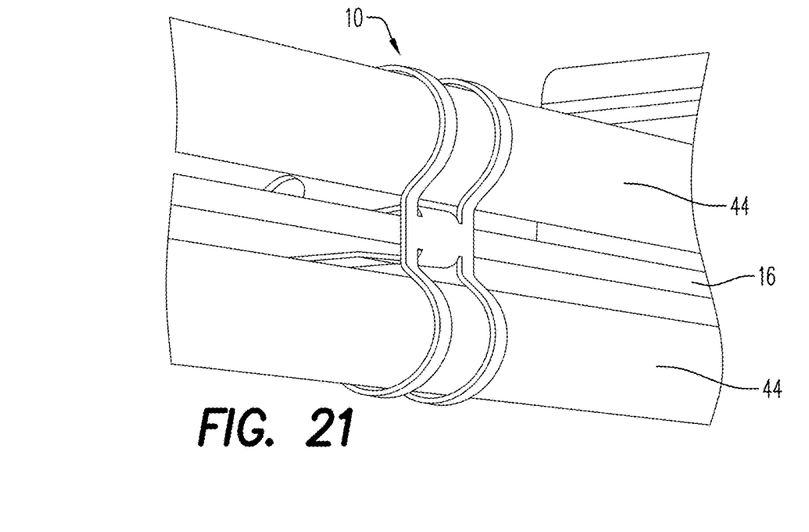
FIG. 21 is a top perspective view of the combination securing clip of FIG. 19 in use with a conduit.

It should also be recognized that clip 10 is disclosed with respect to FIGS. 1-18 as having region 18 that indirectly secures the conduit to surface 16. However, clip 10 is illustrated in FIGS. 19-21 configured to directly secure conduit 44 to surface 16. Here, clip 10 is shown making use of slide on connector 14 connecting the clip to surface 16 for purpose of illustration. In this embodiment, region 18 is shown forming legs 46 that wrap resiliently around and secure conduit 44 to the clip.

In some embodiments, legs 46 can also include region 18—in the form of an opening—that allows the use of clip 10 with strap 20.

It should also be noted that the terms "first", "second", "third", "upper", "lower", and the like may be used herein to modify various elements. These modifiers do not imply a spatial, sequential, or hierarchical order to the modified elements unless specifically stated.

While the present disclosure has been described with reference to one or more exemplary embodiments, it will be understood by those skilled in the art that various changes may be made and equivalents may be substituted for elements thereof without departing from the scope of the present disclosure. In addition, many modifications may be made to adapt a particular situation or material to the teachings of the disclosure without departing from the scope thereof. Therefore, it is intended that the present disclosure not be limited to the particular embodiment(s) disclosed as the best mode contemplated, but that the disclosure will include all embodiments falling within the scope of the appended claims.

PARTS LIST combination securing clip 10
slide-on connector 12
push-in connector 14
surface 16
region 18
bundling strap 20
opening 22
pair of arms 24 inner open region 26
teeth 28
slide-on direction 30
stop 32
outer region 36
barbs 38
push-in direction 40
stamping 42
conduit 44
legs 46

What is claimed is:

1. A combination securing clip, comprising:
a slide-on connector configured to slide on to a surface to secure the clip to the surface;
a push-in connector configured to push in to an opening in the surface to secure the clip to the surface; and
a region securable to a conduit, the region having a solid upper surface, wherein the slide-on and push-in connectors are formed by a pair of arms, each arm of the pair of arms comprising a barb angled in a direction away from a push-in direction and towards the region,
wherein the pair of arms define an inner open region providing the slide-on connector,
wherein each arm of the pair of arms further comprise a tooth in the inner open region, wherein the teeth are vertically and/or horizontally offset from one another,
wherein the teeth are angled in a direction away from a slide-on direction, and
wherein the teeth are cam surfaces to bias the pair of arms outward as the surface is slid into the inner open region in the slide-on direction.

2. The combination securing clip of claim 1, wherein the region is integrally formed with a bundling strap or comprises a leg securable to the conduit.

3. The combination securing clip of claim 1, wherein the region comprises an opening configured to receive a bundling strap.

4. The combination securing clip of claim 1, wherein the region comprises an opening having a bundling strap received therein.

5. The combination securing clip of claim 1, wherein the teeth are contact surfaces to aid in preventing the surface from being withdrawn from the inner open region.

6. The combination securing clip of claim 1, wherein the pair of arms further comprise one or more stops, the one or more stops are angled in a direction toward a slide-on direction.

7. The combination securing clip of claim 6, wherein the one or more stops comprise at least one stop on opposing arms that are vertically and/or horizontally offset from one another.

8. The combination securing clip of claim 1, wherein the pair of arms define an outer region, the outer region providing the push-in connector.

9. The combination securing clip of claim 1, wherein the one or more barbs are cam surfaces to bias the pair of arms inward as the push-in connector is pushed into the opening in the push-in direction.

10. The combination securing clip of claim 1, wherein the one or more barbs are contact surfaces to aid in preventing push-in connector from being withdrawn from opening.

11. The combination securing clip of claim 1, wherein the push-in and slide-on connectors and the region are integrally formed from a metal stamping.

12. A combination securing clip, comprising:
a region securable to a conduit, the region having a solid upper surface;
a slide-on connector configured to slide on to a surface to secure the clip to the surface; and
a push-in connector configured to push in to an opening in the surface to secure the clip to the surface,
wherein the slide-on and push-in connectors are formed by a pair of straight arms depending from the region so that an acute angle is defined between the region and the pair of straight arms,
wherein each arm of the pair of straight arms comprises a tooth, and
wherein the teeth are offset from one another.

13. The combination securing clip of claim 12, wherein each arm of the pair of straight arms terminate at a barb that is angled toward the region and ends with a contact surface that prevents withdraw of the push-in connector from the opening.

* * * * *